United States Patent [19]
Calizano et al.

[11] 4,456,209
[45] Jun. 26, 1984

[54] DEVICE FOR SELECTIVELY SECURING AN OBJECT TO A SHAFT

[75] Inventors: Fernand Calizano, Groslay; Michel Chauvel, Chatenay Malabry, both of France

[73] Assignee: Compagnie Internationale pour l'Informatique CII Honeywell Bull (Societe Anonyme), Paris, France

[21] Appl. No.: 328,634

[22] Filed: Dec. 8, 1981

[30] Foreign Application Priority Data

Dec. 24, 1980 [FR] France .................... 8027419

[51] Int. Cl.³ .................... B65H 19/02; B23B 5/22; B23B 31/40
[52] U.S. Cl. .................... 242/68.1; 242/68.3; 242/72 R; 279/2 R
[58] Field of Search .................... 242/68.3, 72 R, 72.1, 242/68, 68.1, 68.2; 279/2; 250/570

[56] References Cited

U.S. PATENT DOCUMENTS

| | | | |
|---|---|---|---|
| 934,964 | 9/1909 | Ethridge | 242/72 |
| 2,061,109 | 11/1936 | Sieger | 242/72 |
| 2,260,902 | 10/1941 | Hitchcock et al. | 242/72 |
| 3,215,357 | 11/1965 | Foulks | 279/2 X |
| 3,645,464 | 2/1972 | Herger et al. | 242/68.3 |
| 3,801,033 | 4/1974 | Sanderson | 242/68.3 |
| 4,236,682 | 12/1980 | Barton, Jr. | 242/198 |
| 4,243,186 | 1/1981 | Peter et al. | 242/195 |

FOREIGN PATENT DOCUMENTS

26964 4/1981 European Pat. Off. .

Primary Examiner—Stuart S. Levy
Assistant Examiner—Lloyd D. Doigan

[57] ABSTRACT

A magnetic tape reel is secured to a reel drive motor shaft by a device including a hub secured to the shaft, a plurality of shoes, and actuating means for thrusting the shoes against the reel and for releasing them from contact with the reel. The securing device includes a cam mounted on the shaft in combination with a locking device including the cam periphery. The locking device thrusts the shoes against the object and is operated by rotation of the motor. The cam is immobilized in rotation while the shoes are locked.

6 Claims, 6 Drawing Figures

DEVICE FOR SELECTIVELY SECURING AN OBJECT TO A SHAFT

FIELD OF THE INVENTION

The present invention relates generally to a device and method for selectively securing an object to a shaft, and more particularly to a securing device wherein a selectively braked cam selectively drives brake shoe means against the object.

BACKGROUND OF THE INVENTION

The present invention is particularly applicable to installing and locking reels carrying magnetic tapes on magnetic tape winders. In existing data processing systems, magnetic tape winders are widely employed because magnetic tapes have great storage capacity. In currently available magnetic tape winders, a single removable magnetic tape is replaced by another magnetic tape as soon as write and/or read operations relating to the tape have been completed. The tape winder includes first and second reels which carry the tape. The reels alternately receive and supply the magnetic tape to write and/or read heads. Each reel is driven by an electric motor via a direct mechanical linkage. The tape is intermittently driven in either direction relative to the read-write heads such that a relatively small or zero gap exists between the heads and tape. The tape travels at constant, relatively high speeds in a series of accelerations and decelerations having very short durations. Read operations occur in either direction of travel, while write operations occur only as the tape is traveling in one direction.

As a tape winder is being used, it is necessary frequently to change the tape and feed reel associated therewith on a particular winder. Because feed reel changing operations should be performed as rapidly as possible, the changes should be uncomplicated and involve a minimum number of actions on the part of an operator. It is also necessary during tape winding conditions, in either direction, for the reel to be effectively locked on a shaft of the winder motor. Otherwise, reliable operation of the tape winder is not assured. Thus, devices for securing magnetic tape reels on winder motor shafts should be simple in conception, easy to apply to and remove from the reel, and assure reliable and effective reel locking to the shafts. Reel securing devices, i.e., reel carriers, fulfilling these requirements are known. However, each of them has certain shortcomings.

One prior art reel securing device includes a circular rubber ring that selectively contacts a circular surface of a central hole of a reel. The ring is carried by a movable, circular element, situated on a hub of the reel carrier, which hub is integral with the motor shaft. The movable circular element is typically actuated by an electromagnet. After the reel has been placed on the reel carrier, the electromagnet is actuated such that the diameter of the movable element increases, whereby the movable element compresses the rubber ring between the reel carrier and the reel to lock the reel to the reel carrier, causing the reel to be immobilized in rotation with respect to the reel carrier. A disadvantage of this device is that the rubber ring has been found to deteriorate rapidly. Furthermore, the rubber ring tends to stick occasionally against the surface of the central hole in the reel. Also, it is difficult to automate this prior art device.

A second type of device for fastening a reel on a motor shaft includes a plurality of movable pads carried by shoes integral with the reel carrier hub. The pads selectively contact the surface of the reel central hole. The shoes are operated by a plurality of small rods, integral with a bar passing through the motor shaft. The small rods are driven by an electromagnet positioned at one extremity of the motor shaft. When it is intended to lock the reel on the reel carrier, the electromagnet is operated to thrust the bar so that it engages the shoes, causing the shoes to spread apart and drive the pads into contact with the surface of the central reel hole.

This prior art device requires a comparatively bulky and powerful electromagnet. While the electromagnet may be replaced by a pneumatic device operating a jack in response to high or low pressure, there are other disadvantages of this second device, relating to cost and complexity.

Both of the previously mentioned prior art devices require an internal means for supplying power to a fastening device that locks the reel on the reel carrier, i.e., an electromagnet or a pneumatic system. The internal devices for supplying power to the fastening device are comparatively heavy, bulky and operate only during extremely short time intervals, i.e., during operations when a reel is installed or removed. The internal devices for supplying power to the fastening devices are superfluous during data read and write operations associated with the magnetic tapes driven by the tape winder.

It is, accordingly, an object of the present invention to provide a new and improved method of and device for enabling an object to be easily secured to and removed from a motor shaft and which enables the object to be locked securely onto the shaft.

Another object of the present invention is to provide a new and improved method of and device for enabling magnetic tape reels to be easily secured to and removed from magnetic tape winders and for enabling the tape reels to be locked securely in situ on a motor shaft of the winder.

A further object of the invention is to provide a new and improved device for enabling magnetic tape reels to be secured to and removed from shafts of magnetic tape winders, wherein the devices do not require internal means for supplying power to a locking device for the reel on a reel carrier.

Still another object of the invention is to provide a new and improved method of and device for enabling magnetic tape reels to be secured to and removed from magnetic tape winder motor shafts, wherein the motor shaft supplies power to a fastening device for locking the reel on a reel carrier.

Still another object of the invention is to provide a new and improved, relatively easy to utilize, inexpensive, relatively simple, and small device for enabling an object to be secured to and removed from a shaft which is driven at a constant, relatively high speed and undergoes high acceleration and deceleration in either direction as it is driven to the constant speed, while maintaining the object in a locked condition on the shaft.

BRIEF SUMMARY OF THE INVENTION

In accordance with the present invention, a cam mounted on a motor shaft is immobilized in rotation during reel locking and unlocking operations. The cam is associated with a roller engaging the cam periphery. The cam is coupled to the motor shaft and to movable brake shoe pads which selectively engage a wall or surface of the central reel hole. The cam includes two notches or grooves having nadirs at axes 90° relative to each other and at different radii from the intersection of these axes which is coincident with the motor axis about which the cam is driven. The roller may occupy one of two stable positions, in either of the grooves. While the roller is in the groove at the smaller radius relative to the motor shaft axis, the pads do not contact the surface or wall of the reel central hole, whereby the reel is not locked. In contrast, with the roller in the other stable condition, in the groove at the greater radius from the motor shaft axis, the brake pads contact the surface of the reel central hole, causing the reel to be locked. It has been found that the structure is very simple, convenient, relatively inexpensive, and not bulky.

The invention thus enables an object to be locked onto and removed from a motor shaft. The device comprises a hub secured to the shaft. Shoe means are positioned to selectively contact the object within a recess of the object. Control means selectively urges the shoe means against a wall of the recess and releases the shoe means from contact with the wall. The control means includes a cam slippingly mounted on the motor shaft. An object locking means acts in conjunction with the cam periphery in such a manner as to thrust the shoes against the wall of the object and free the shoes from any contact with the object. The object locking means is actuated by rotation of the motor, and thereby does not require a secondary power source within the device to lock and remove the object from the motor shaft. The cam is immobilized when the locking means thrusts the shoes against the object. The cam is also immobilized in rotation when the locking means frees the shoes from contact with the object.

The above and still further objects, features and advantages of the present invention will become apparent upon consideration of the following detailed description of one specific embodiment thereof, especially when taken in conjunction with the accompanying drawings.

DETAILED DESCRIPTION OF THE DRAWING

While the following detailed description relates to a device for securing a tape reel to a shaft of a tape winder motor, it is to be understood that certain aspects of the invention can be utilized to secure any object to the shaft of any motor.

Figure 1:
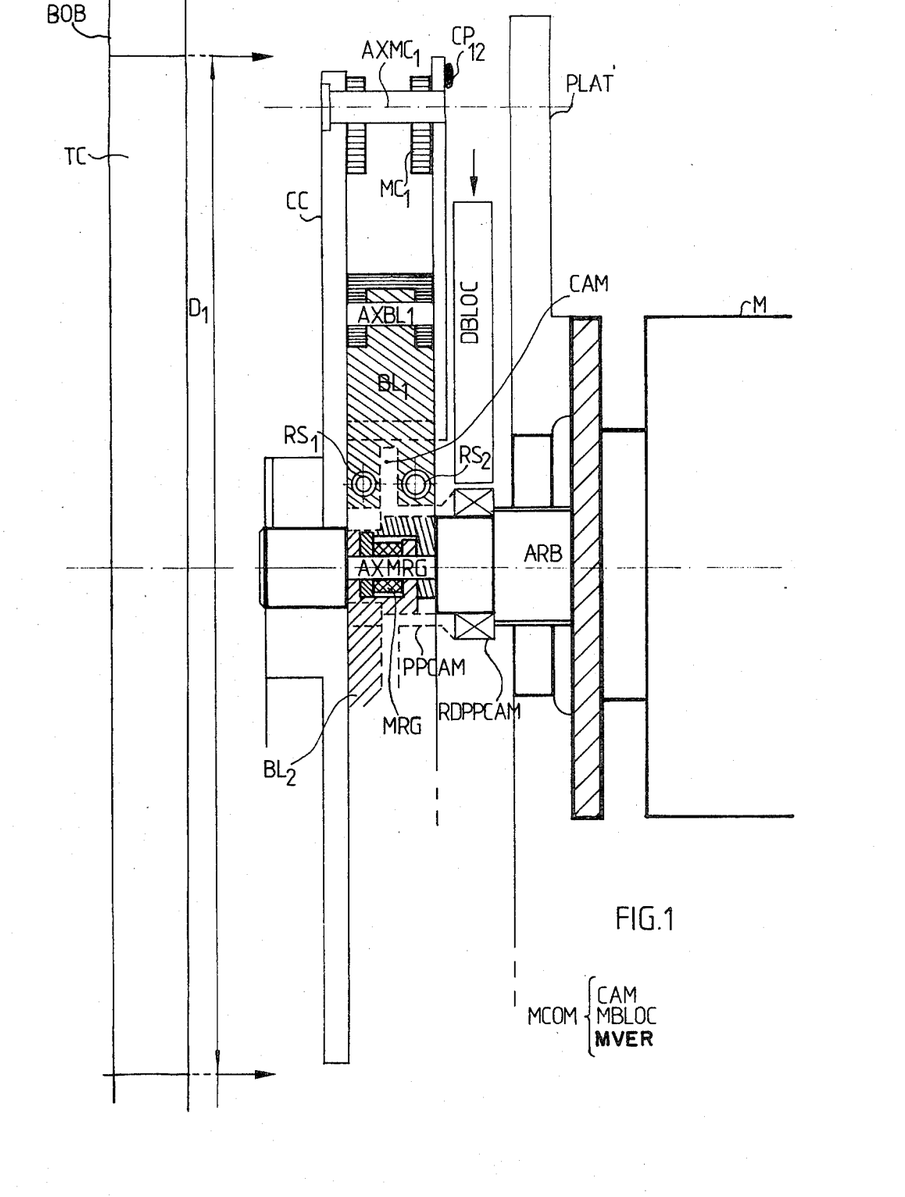
FIG. 1 is a cross-sectional view of a securing device in accordance with a preferred embodiment of the invention wherein the plane of the cross section is a plane containing the axis of rotation of the motor shaft.
Figure 2:
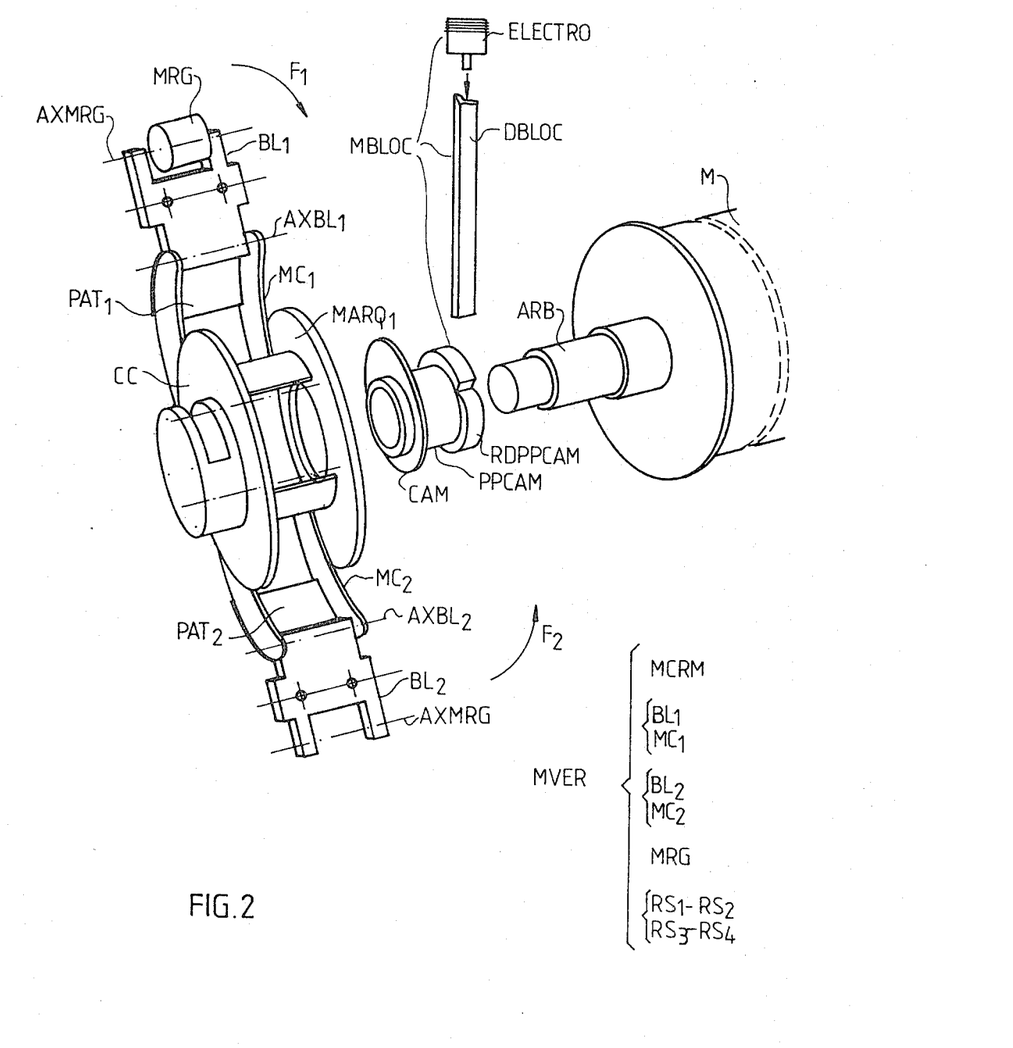
FIG. 2 is an exploded three-quarter perspective view of mutually separated, different elements forming the device illustrated in FIG. 1.

Reference is now made to FIGS. 1 and 2 of the drawing wherein the object to be secured to the shaft of a motor in the preferred embodiment is illustrated as reel BOB carrying a magnetic tape. Reel BOB is to be secured to shaft ARB of an electric tape winder motor M, fixedly mounted on plate PLAT by any suitable means (not shown). Once reel BOB has been placed in position on shaft ARB, the reel must be firmly secured to the shaft in a precise manner so that the reel axis of rotation coincides with the rotation axis of the shaft. There must be no tendency whatsoever for the reel to vibrate as the shaft is driven at a relatively constant, high speed, with a series of accelerations and decelerations, in either direction. Reel BOB has a central, circular aperture TC, having a diameter $D_1$ and a center aligned with the axis of motor shaft ARB when the reel is secured to the locking mechanism of the present invention.

The locking mechanism of the present invention includes a central, circular hub CC coaxial with the axis of motor shaft ARB, and having a diameter slightly less than diameter $D_1$ of aperture TC in reel BOB. Secured to hub CC are a plurality of brake shoes, equally angularly spaced about the axis of motor shaft ARB. In the preferred, illustrated embodiment, two movable brake shoes $PAT_1$ and $PAT_2$ are angularly displaced by 120° from each other and are at the same radial position at all times from the axis of shaft ARB. A third, stationary brake shoe $PAT_F$, angularly displaced by 120° from movable shoes $PAT_1$ and $PAT_2$, is fixedly mounted on hub CC so that it engages an interior wall of aperture TC of reel BOB. It is to be understood that the two movable and one stationary shoes can be replaced by two stationary shoes and one movable shoe.

Figure 3:
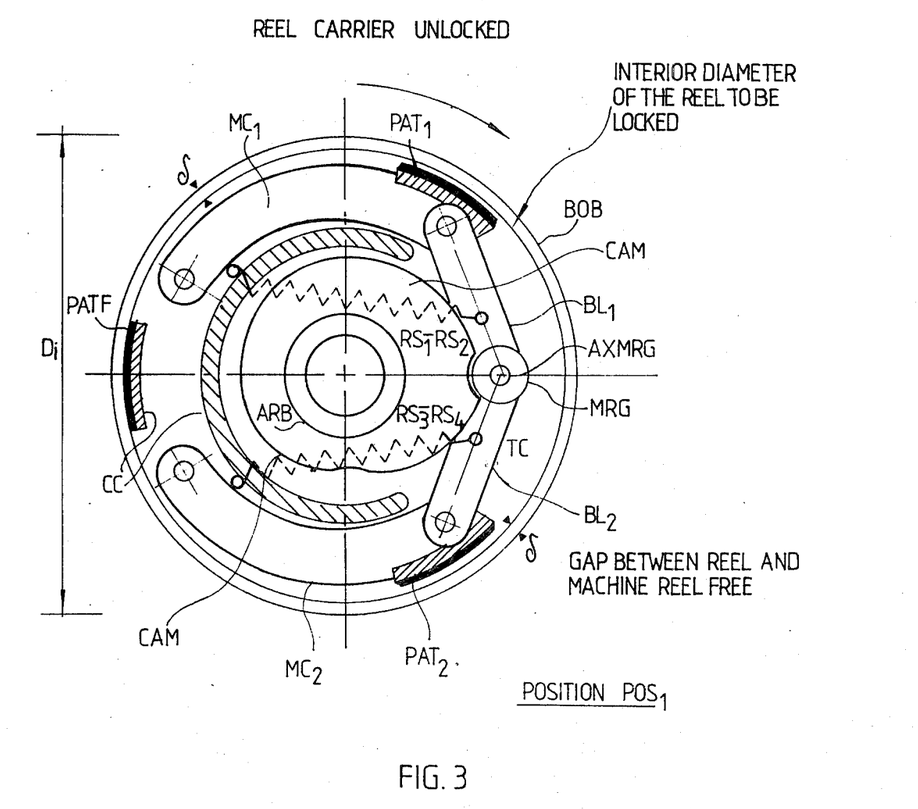
FIGS. 3 and 4 are cross-sectional views of the device illustrated in FIG. 1, taken in a plane at right angle to the axis of the motor shaft rotation, wherein brake shoes are respectively in engagement with and out of engagement with a wall of a reel central hole.
Figure 4:
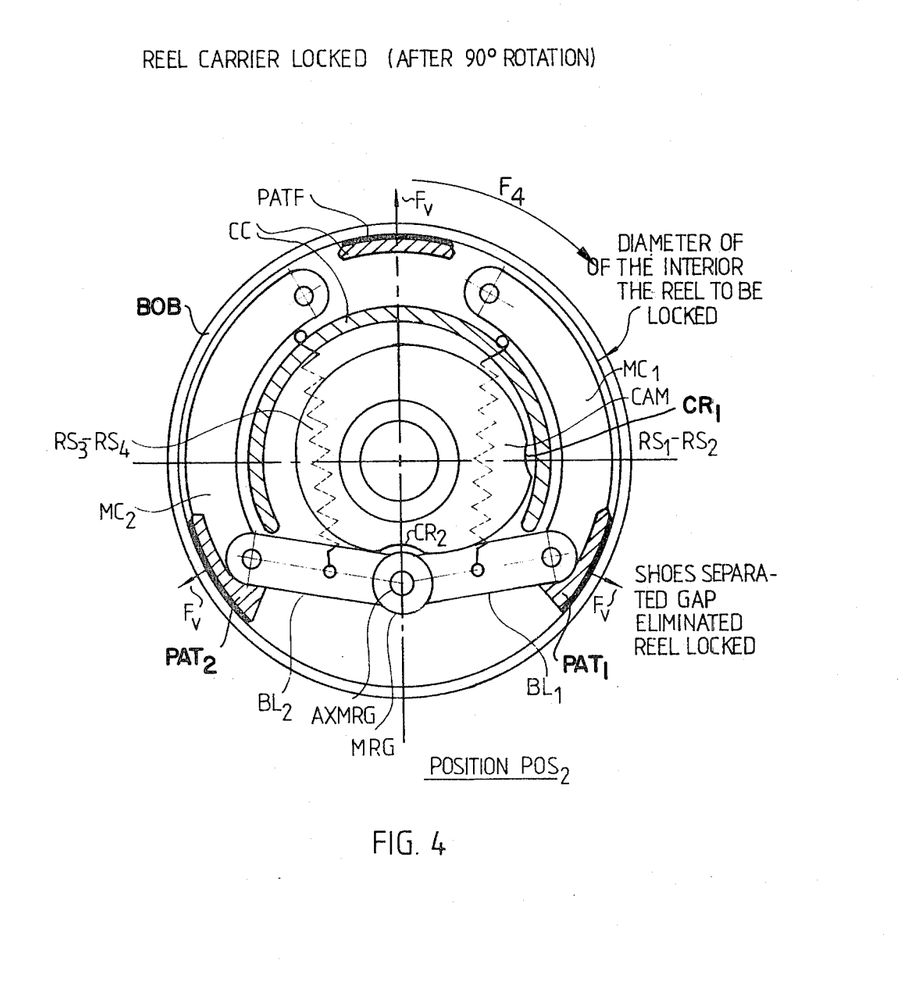

A controller MCOM for the radial position of shoes $PAT_1$ and $PAT_2$, as well as the angular position of all three shoes, i.e., shoes $PAT_1$, $PAT_2$, and $PAT_F$, includes a generally oval shaped cam CAM fixedly mounted on cam shaft PPCAM, in turn coaxially mounted on motor shaft ARB so that the cam shaft slips relative to the motor shaft. As illustrated in FIGS. 3 and 4, cam CAM is of generally oval shape, having major and minor axes that intersect each other at a point coincident with the axis of motor shaft ARB. Cam CAM includes two grooves or indentations, each havng a nadir coincident with the major and minor axes of the cam and at right angles to each other.

To selectively lock and unlock reel BOB on hub CC, a reel locking means NVER includes arcuate, preferably identically configured jaws $MC_1$ and $MC_2$, selectively outwardly urged from the axis of motor shaft ARB, with which they are coaxial. Jaws $MC_1$ and $MC_2$ are pivotally mounted on posts extending in a direction parallel to the axis of motor shaft ARB and extending between parallel discs that are an integral part of hub CC. Jaws $MC_1$ and $MC_2$ pivotally carry straight, preferably identically configured links $BL_1$ and $BL_2$, pivotally mounted in proximity to the jaws. At one end of each of links $BL_1$ and $BL_2$ remote from pivot links $AXBL_1$ and $AXBL_2$, where the links are joined to jaws $MC_1$ and $MC_2$, are cavities in which roller MRG is positioned. Roller MRG is carried by shaft AXMRG, extending through aligned bores in links $BL_1$ and $BL_2$ in a direction parallel to the axis of shaft ARB. Because shaft AXMRG for roller MRG extends through aligned bores of links $BL_1$ and $BL_2$, the links are hinged to each other and can swing towards each other in opposite directions, as indicated by arrows $F_1$ and $F_2$. Roller MRG rides on the periphery of cam CAM and is dimensioned so that it can assume two stable positions in each of the grooves on the cam. Jaws $MC_1$ and $MC_2$ respectively carry the pads of brake shoes $PAT_1$ and $PAT_2$. Dropped line on page 94 of draft respectively mounted on jaws $MC_1$ and $MC_2$ in proximity to links $BL_1$ and $BL_2$, tension springs $RS_1$-$RS_4$ are provided. Tension springs $RS_1$ and $RS_2$ are mounted on posts having longitudinal axes extending in the same direction as the axis of shaft ARB and extending from opposite, parallel faces of link $BL_1$. The other ends of tension springs $RS_1$ and $RS_2$ are secured to a post secured to the outer periphery of an arcuate, partial ring that is a part of hub CC. This partial annular ring is coaxial with the axis of motor shaft ARB. Tension springs $RS_3$ and $RS_4$ are similarly mounted to posts on opposite parallel faces of link $BL_2$ and are connected to a post on the annular partial ring of hub CC.

To enable cam CAM and cam shaft PPCAM to be locked in position relative to plate PLAT and the housing for tape winder motor M, cam locking means MBLOC is provided. Cam locking means MBLOC includes a notched ring RDPPCAM carried by cam shaft PPCAM at an axial position displaced from cam CAM. Ring RDPPCAM includes a radially extending notch that is selectively engaged by catch DBLOC, formed as an elongated rod having a rectangular cross section. Catch DBLOC is selectively driven into the notch of ring RDPPCAM by electromagnet ELECTRO. When it is desired to put reel BOB on hub CC or remove the reel from the hub, cam CAM is locked in position by activating electromagnet ELECTRO so that catch DBLOC is driven into the notch of ring RDPPCAM. With cam CAM and cam shaft PPCAM locked in position, motor shaft ARB can turn within the cam shaft, whereby the cam can slip relative to the motor shaft.

Figures 5, 5B:
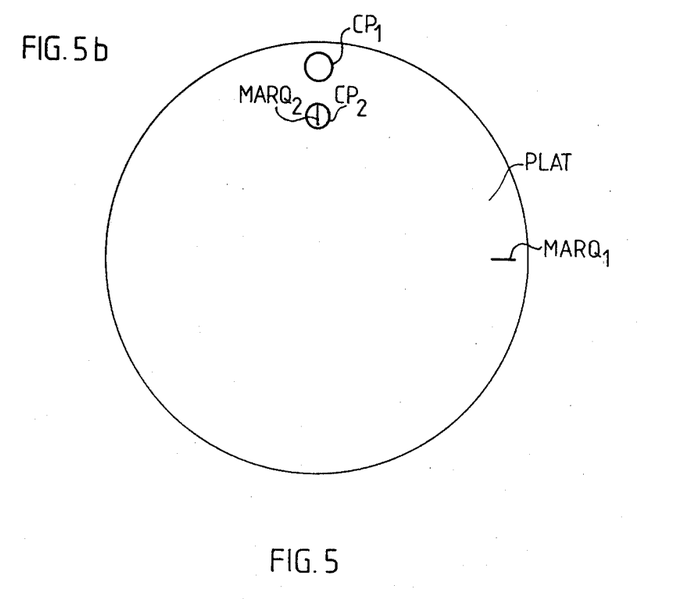
FIGS. 5a and 5b are illustrations of marks and photocells for controlling the rotation of a winder motor shaft.
Figure 5A:
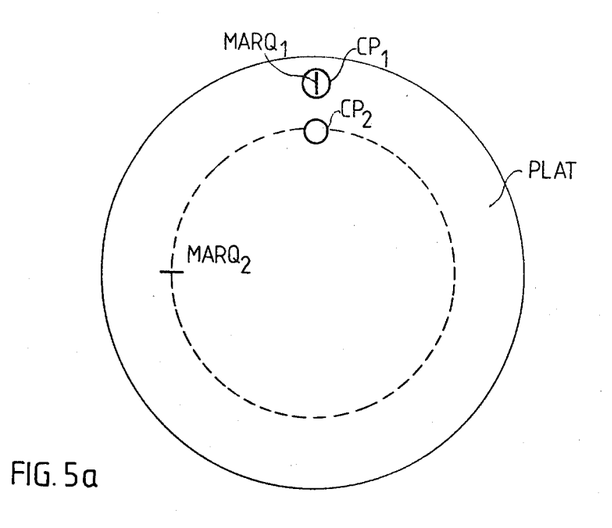

To control the locking and unlocking of reel BOB relative to shaft ARB, the shaft is driven through an angle of 90° and then through an angle of 270°. To control the movement of shaft ARB two photocells $CP_1$ and $CP_2$ are fixedly mounted relative to shaft ARB, on plate PLAT, as illustrated in FIGS. 5a and 5b. In particular, photocells $CP_1$ and $CP_2$ are located along the same radius that extends through the axis of shaft ARB, such that the distance of cell $CP_2$ from the shaft axis is less than the distance of cell $CP_1$ from the shaft axis. Cells $CP_1$ and $CP_2$ are mounted in an identical plane at right angles to the axis of shaft ARB. Cells $CP_1$ and $CP_2$ are selectively responsive to reflected optical energy from light sources (not shown), positioned on plate PLAT and arranged so light from them is normally reflected from a disc of hub CC in closest proximity to the plate onto the cells. The light normally incident on cells $CP_1$ and $CP_2$ is interrupted by markers $MARQ_1$ and $MARQ_2$, respectively. Markers $MARQ_1$ and $MARQ_2$ are coaxial with the axis of shaft ARB and positioned from the axis by the same distance as cells $CP_1$ and $CP_2$. Markers $MARQ_1$ and $MARQ_2$ are displaced angularly from each other by 90° and are positioned on the face of one of the parallel discs included in hub CC that is in closest proximity to plate PLAT. Thereby, in response to shaft ARB driving hub CC to a first position where marker $MARQ_1$ is aligned with cell $CP_1$, the light normally incident on cell $CP_1$ is interrupted, causing a signal to be supplied to motor M, to stop rotation of the motor. In response to the motor being subsequently activated to drive shaft ARB through a 90° angle, marker $MARQ_2$ blocks the light normally incident on photocell $CP_2$, again causing the motor to stop. Motor M is again activated to drive shaft ARB and hub CC through 270° so that marker $MARQ_1$ is again aligned with photocell $CP_1$, whereby the light incident on photocell $CP_1$ is again blocked, to stop the motor at the original position.

To provide a more complete and better understanding of the operation of the present invention, consideration is now given to the four stages involved in locking reel BOB to hub CC and then to the four stages which are involved in unlocking the reel from the hub.

The first stage involved in the locking operation is to activate motor M so that shaft ARB drives hub CC to a position where marker $MARQ_1$ is aligned with photocell $CP_1$, as illustrated in FIG. 5a. In response to marker $MARQ_1$ being aligned with photocell $CP_1$, motor M is stopped at a position where the notch in ring RDPPCAM is aligned with catch DBLOC of cam lock MBLOC.

With the notch in ring RDPPCAM aligned with catch DBLOC, the second stage involved in the reel insertion and locking operation is performed by activating electromagnet ELECTRO so that catch DBLOC is driven downwardly, to engage the notch in ring RDPPCAM. With ring RDPPCAM locked in position, cam CAM is positioned as illustrated in FIG. 3, whereby the notch along the major axis of the cam receives roller MRG. In this position, the exterior surfaces of movable shoes $PAT_1$ and $PAT_2$ are spaced from the axis of shaft ARB by a distance $D_i/2$, i.e., less than the radius of circular aperture $T_C$ in reel BOB. Reel BOB is now placed over hub CC, so that the upper portion of the aperture wall engages the upper portion of hub CC.

The third stage in the reel insertion and locking operation is now performed. Motor M is activated to drive shaft ARB through a 90° angle, whereby marker $MARQ_2$ is aligned with photocell $CP_2$, causing the motor shaft to stop. Because cam lock MBLOC is activated, cam CAM remains stationary as shaft ARB rotates through 90°. However, hub CC and the parts integral therewith, such as jaws $MC_1$ and $MC_2$, links $BL_1$ and $BL_2$, brake shoes $PAT_1$ and $PAT_2$ and roller MRG, are rotated through 90° in response to a 90° rotation of shaft ARB. Thereby, the locking mechanism assumes the position illustrated in FIG. 4, such that roller MRG is aligned with the notch on cam CAM that extends along the minor axis of the cam. The 90° rotation of links $BL_1$ and $BL_2$ and roller MRG causes the links to expand relative to the position they occupied at position $POS_1$, wherein roller MRG is in the notch on can CAM along the major cam axis. A small clearance remains between the surface of roller MRG and the peripheral surface of cam CAM at this time. Brake shoes $PAT_1$ and $PAT_2$ are thrust against the internal surface of the wall in aperture TC of reel BOB, and roller MRG remains in recess $CR_2$ under tension established by springs $RS_1$-$RS_4$. Under these circumstances, brake shoes $PAT_1$ and $PAT_2$ exert forces $F_y$ on the internal wall of aperture TC of reel BOB, as does stationary shoe $PAT_F$. Stationary shoes $PAT_F$ exerts the same thrust force $F_y$ on the wall of aperture $T_C$. Reel BOB is now locked to hub CC.

The fourth stage involves deactivating cam lock MBLOC, whereby catch DBLOC is removed from the notch in ring RDPPCAM, a result achieved by deactivating electromagnet ELECTRO. Under these conditions, brake shoes $PAT_1$ and $PAT_2$ remain in contact with the interior wall of central aperture $T_C$ or reel BOB because notch $CR_2$ captures roller MRG, to hold the roller in place at a fixed point on the periphery of cam CAM, aligned with the minor axis of the cam. Each of the elements of the assembly thus described then turns at an identical rotation speed V, commensurate with the rotation speed of shaft ARB. Reel BOB is now firmly locked to hub CC, enabling magnetic tape to be wound on and paid from the reel in response to motor M being activated to drive shaft ARB in either direction during normal operation of a data processor of which the magnetic tape is a part.

When it is desired to remove the magnetic tape and reel BOB that carries it from shaft ARB and replace them with another tape and reel, the position of the locking mechanism in accordance with the present invention relative to shaft ARB is as illustrated at position POS$_2$, FIG. 4. When it is desired to remove reel BOB, motor M drives shaft ARB and cam shaft PPCAM to a position wherein marker MARQ$_2$ is aligned with photocell CP$_2$, FIG. 5b. Electromagnet ELECTRO is then energized, whereby catch DBLOC engages the notch in ring RDPPCAM, to immobilize cam CAM at the position illustrated in FIG. 4. Thus, the first stage in the unlocking operation is performed.

The second stage of the unlocking operation involves energizing motor M so that it rotates through an angle of 270°, such that marker MARQ$_1$ is aligned with photocell CP$_1$, FIG. 5a. Simultaneously, the assembly formed by hub CC, jaws MC$_1$ and MC$_2$, links BL$_1$ and BL$_2$, roller MRG and brake shoes PAT$_1$ and PAT$_2$ turns through an angle of 270°, so that it occupies position POS$_1$, FIG. 3. A gap $\Delta$ is again present between the exterior faces of brake shoes PAT$_1$ and PAT$_2$ and the wall in central aperture T$_C$ or reel BOB.

With cam CAM immobilized and shaft ARB at the position wherein marker MARQ$_1$ is aligned with photocell CP$_1$, reel BOB is removed from hub CC. If another reel is to be loaded immediately onto hub CC, electromagnet ELECTRO remains energized, to immobilize cam CAM. If, however, it is not necessary to immediately load another reel onto hub CC, electromagnet ELECTRO is de-energized, thereby freeing catch DBLOC from the notch in ring RDPPCAM.

While there has been described and illustrated one specific embodiment of the invention, it will be clear that variations in the details of the embodiment specifically illustrated and described may be made without departing from the true spirit and scope of the invention as defined in the appended claims.

We claim:

1. A device for releasably securing an object to a shaft having an axis and driven by a motor mounted on a support plate, said object being provided with a central recess so that when the object is secured the central recess turns about the axis, said device comprising:
   a hub coaxial with the axis and secured to said shaft,
   a plurality of frictional engagement shoes mounted on said hub, at least one of said shoes being movable radially relative to the axis, said shoes being annularly disposed on said hub and facing said recess to lock said object when each movable shoe is at a locked position where it is in frictional engagement with a wall of said central recess and to unlock said object when each movable shoe is at an unlocked position,
   a sleeve fitted loosely over said shaft and provided with a cam having a contour coacting with each movable shoe such that relative rotary movement of said shaft and of said sleeve causes radial movement of each movable shoe, said cam being located placed relative to said hub such that each movable shoe is in an unlocked position,
   first detecting means mounted on said hub and on said support plate and arranged to derive a first signal causing the motor to be temporarily stopped in response to said hub being at a first predetermined rotational position,
   immobilizing means mounted on said sleeve and on said support plate and responsive to said first signal for immobilizing said sleeve and said cam in response to said hub being at said first rotational position so that said cam causes each movable shoe to be moved towards the locked position thereof in response to said motor being again activated, and
   second detecting means mounted on said hub and on said support plate and arranged to derive a second signal in response to said hub being at a second predetermined rotational position where each movable shoe is driven to a locking position therefor by said cam, said second signal causing the motor to be temporarily stopped, said immobilizing means being further responsive to said second signal for releasing said sleeve and said cam when said motor has been stopped in response to said second signal.

2. The device of claim 1, wherein the first detecting means comprises a first photoelectric cell and a first marker, and the second detecting means comprises a second photoelectric cell and a second marker, said first and second cells being mounted on the support plate and respectively situated at different distances d$_1$ and d$_2$ from the axis, said cells being positioned in the same plane and aligned on the same straight line passing through the axis, said markers being disposed on one surface of the hub located opposite the support plate, said first and second markers being spaced from the axis by distances respectively equal to d$_1$ and d$_2$ and being angularly positioned from each other by an angle equal to that formed between the first and second predetermined rotational positions of the hub.

3. The device of claim 1 wherein the immobilizing means comprises:
   a ring secured to the sleeve and provided with a notch,
   a catch mounted on the support plate and arranged to be selectively driven to first and second states, the catch while in the first state engaging said notch and preventing rotation of the sleeve, the catch while in the second state releasing said sleeve, said notch being aligned with said catch when the hub is at a first predetermined rotational position thereof and the cam is normally located relative to said hub such that each movable shoe is in an unlocked position thereof, and
   an electromagnet disposed on the support plate for actuating said catch, said electromagnet being electrically (i) activated in response to the hub being at a first rotational position thereof for engaging said catch in said notch, and (ii) deactivated in response to said hub being at a second rotational position thereof.

4. The device of claim 1, wherein the first and the second rotational positions of the hub are angularly disposed from each other by 90°, and the cam having a contour shaped to drive each movable shoe from the unlocked position to the locked position thereof in response to said hub being rotated relative to the sleeve through an angle equal to 90°.

5. A device for releasably securing a tape reel to a shaft having an axis and driven by a motor mounted on a support plate, said reel being provided with a central circular aperture so that when the reel is secured to the shaft the reel turns, said device comprising:
a hub secured to said shaft,
a stationary frictional shoe fixedly mounted on said hub,
first and second jaws pivotally mounted on posts integral with said hub, said posts being disposed on both sides of said stationary shoe and extending in a direction parallel to the axis,
first and second movable shoes secured respectively to said first and second jaws, said stationary and movable shoes facing said central aperture,
a first link having a first end hinged on a free end of said first jaw,
a second link having a first end hinged on a free end of said second jaw,
a roller bearing axle pivotally mounted at second ends of said first and second links so that said links are hinged to each other,
a roller carried by said axle,
a sleeve fitted loosely over said shaft and provided with a cam having a contour coacting with said roller such that relative rotary movement of said shaft and of said sleeve causes movement of the jaws and the movable shoes to lock the tape reel in response to each movable shoe being at a locked position where it is in frictional engagement with said central aperture and to unlock said reel in response to each movable shoe being at an unlocked position, said cam being normally positioned relative to said hub such that each movable shoe is in the unlocked position,
first detecting means mounted on said hub and on said support plate and arranged to generate a first signal causing the motor to be temporarily stopped when said hub is at a first predetermined rotational position,
immobilizing means mounted on said sleeve and on said support plate and responsive to said first signal for immobilizing said sleeve and said cam where said hub is at said first rotational position so that said cam drives each movable shoe towards the locked position thereof in response to said motor being again activated, and
second detecting means mounted on said hub and on said support plate and arranged to derive a second signal in response to said hub at a second predetermined position where each movable shoe is at the locked position thereof where said second signal causes the motor to be temporarily stopped, said immobilizing means being further responsive to said second signal for releasing said sleeve and said cam when said motor has been stopped by said second signal.

6. The device of claim 5 wherein the first and the second rotational positions of the hub are angularly disposed from each other by 90°, and the cam has a substantially oval contour, the oval of the contour having major and minor axes that intersect at right angles to each other at a point coincident with the axis, said cam including first and second grooves having nadirs respectively on said major and minor axes, the roller being capable of occupying only two possible stable positions in said first and second grooves.

* * * * *